United States Patent

[11] 4,214,063
[45] Jul. 22, 1980

Luallin

[54] AUTOREFRIGERATED POLYMERIZATION PROCESS

[75] Inventor: Edwin D. Luallin, Baytown, Tex.

[73] Assignee: Exxon Research & Engineering Co., Florham Park, N.J.

[21] Appl. No.: 2,627

[22] Filed: Jan. 11, 1979

[51] Int. Cl.² .................... C08F 2/02; C08F 6/28
[52] U.S. Cl. ........................... 526/68; 528/498
[58] Field of Search ................... 528/498; 526/68

[56] References Cited

U.S. PATENT DOCUMENTS

| 3,259,614 | 7/1966 | Pollock | 526/905 |
|---|---|---|---|
| 3,271,380 | 9/1966 | Dietz | 528/485 |
| 3,356,669 | 12/1967 | Houser | 528/502 |
| 4,053,697 | 10/1977 | Asada et al. | 526/142 |
| 4,058,652 | 11/1977 | Smith et al. | 526/68 |

*Primary Examiner*—Stanford M. Levin
*Attorney, Agent, or Firm*—B. C. Cadenhead; M. B. Kurtzman

[57] ABSTRACT

A process for the polymerization of propylene or copolymers of propylene and other olefins is described wherein monomer is contacted with a catalyst in a reaction zone having both a liquid and a vapor phase followed by subjecting a polymer slurry withdrawn from the reaction zone to a degassing step and a wash step in a liquid phase wash zone using propylene as the wash liquid.

10 Claims, 2 Drawing Figures

AUTOREFRIGERATED POLYMERIZATION PROCESS

BACKGROUND OF THE INVENTION

The polymerization of olefins, particularly propylene, is well known and well described in the patents and literature. A number of reaction, catalyst deactivation and product recovery schemes are also well known and widely described. However, certain methods for each step are known to have considerable advantages over other methods such as, for example, an autorefrigerated reaction vessel wherein the monomer, diluent if applicable, catalyst and, when applicable, molecular hydrogen are brought together in a reaction zone having both a liquid and vapor phase. One such reaction scheme utilizing an autorefrigerated reactor is described in U.S. Pat. Nos. 3,259,614 and 4,058,652, for example. The vaporization of the liquid, preferably propylene, in which the reaction is being conducted, removes heat from the reaction mixture, thus maintaining the temperature and pressure relationships in the reaction medium. The propylene thus removed can then be cooled either by indirect heat exchange or direct contact with cooler fluids, usually liquid propylene, and returned to the reactor. Often this return of the liquid propylene provides a convenient way for adding catalyst components, or hydrogen, to the reaction zone. The autorefrigerated reaction scheme is advantageous for use in the manufacture of polypropylene since heat removal is simplified and more efficient allowing the advantages of large scale to be realized. Fouling problems are minimized resulting in longer run length before cleaning.

Further, in the recovery of solid polymeric propylene or copolymers of propylene and other olefins such as, for example, ethylene, it is known to clean the solid polymer containing catalyst residue by a liquid phase washing with a hydrocarbon, such as heptane and/or alcohol, to remove the catalyst residues, or "ash," and amorphous polymer to provide a purified product which will meet commercial product specifications. To meet such specifications, the catalyst residue and amorphous polymer must be removed to the extent that the polypropylene contain not more than about 5 to 15 ppm titanium, about 10 ppm aluminum, and less than about 20 ppm of chlorine. Typically, purified polypropylene product would contain at least about 95% boiling heptane insoluble isotactic polypropylene. However, hydrocarbon/alcohol wash methods require considerable separation steps and energy consumption to recover and recycle the materials.

Another known washing technique, washing with liquid propylene, is particularly preferred since it avoids the introduction of extraneous hydrocarbons (diluent), alcohols, etc. that require additional separation steps to prevent their introduction and/or other resulting polar compounds into the polymerization reactor (during recycle). Washing with liquid propylene is satisfactory for lowering the impurities content such as catalyst residues and amorphous, soluble, polymer to acceptable levels. The liquid propylene wash of solid propylene polymers is described in many U.S. patents such as, for example, U.S. Pat. No. 3,356,669 which describes a liquid propylene wash system as well as other prior art extractants for catalyst residues. But such patent points out the difficulty of using such system heretofore in that it requires the use of a liquid phase polymerization reaction zone and catalyst deactivation system to take advantage of the liquid phase wash with propylene. Moreover, the liquid propylene wash system described therein is operated batch-wise, utilizing progressively decreasing temperatures for the liquid propylene wash media.

U.S. Pat. No. 3,259,614 describes a process whereby the propylene is polymerized in an autorefrigerated reactor. The patent further discloses introducing propylene into the bottom of a draw-off leg to wash propylene soluble catalyst residue and propylene soluble polymer countercurrently back into the bottom of the reactor. However, even with this procedure the propylene insoluble catalyst must still be deactivated, solubilized and removed from the polymer slurry in order to produce purified solid polymer product. In the described process, such would require the use of a deashing zone separate from the polymerization reactor and draw-off leg to avoid the introduction of catalyst deactivating agent into the reactor which otherwise would have adverse effects on the polymerization reaction.

Belgium Pat. No. 824,438, published May 15, 1975, also describes a system whereby a liquid phase reactor using propylene as the reaction medium is used in conjunction with a counter-current liquid propylene wash column. Considerable accommodation is necessary in order to provide cooling for the reactor. Moreover, there is no mention of the problem of flashing of the polymer slurry at the entrance into the wash zone as described hereafter. An autorefrigerated reactor which has a propylene liquid phase and a vapor phase system could have helped solve the cooling problem but, until now, a method for combining an autorefrigerated reactor and a liquid propylene wash was not available.

Thus, it is seen from the foregoing and other patents in the art that washing polymer impurities such as, for example, catalyst residues and soluble polymer, from solid propylene polymers by liquid propylene washing and preparing a solid propylene polymer in an autorefrigerated reactor are, separately, known. Yet, until this invention, those skilled in the art have not heretofore been able to take advantage of these two individually desirable processing steps in a single method. Direct introduction of the reactor slurry into the liquid propylene wash zone with the attendant pressure drop necessary to convey the polymer slurry would cause flashing of propylene to vapor with the resulting agitation adversely affecting the efficient operation of the product wash. The following described invention combines these two highly desirable processing steps into an efficient unitary method for the preparation of polypropylene or copolymers of propylene and other olefins, i.e., ethylene.

SUMMARY OF THE INVENTION

Polymers of propylene and copolymers thereof are prepared by contacting liquid propylene with a Ziegler-type cocatalyst system comprising a titanium halide component and an organo-metal component, in a reaction zone having a liquid phase and a vapor phase operated at a pressure whereby the liquid and vapor phases are in equilibrium. The reaction occurs in the liquid phase to produce a slurry of solid polymer, usually from about 40 to about 60 weight of the liquid phase. The polymer, as is characteristic of the polymerization of propylene, is contaminated with catalyst residue which must be deactivated and, ultimately, removed along with soluble, amorphous polymer. The heat of the reaction is removed by withdrawing propylene vapors from the vapor phase of the reaction zone. This polymerization reaction process is referred to in the art as an autorefrigerated process. As mentioned, inherent in this reaction process is the necessity to operate the reactor at a pressure whereby the propylene liquid and vapor phases are in equilibrium.

The liquid slurry, containing solid polypropylene, catalyst residue, amorphous polymer and liquid propylene is withdrawn from the polymerization reaction zone and introduced into a degassing zone where the pressure is lowered to a point below that at which the reaction zone was being maintained to convey the slurry from the reaction zone and to allow additional propylene to vaporize, thus further reducing the slurry temperature somewhat. The polymer is also contacted with catalyst deactivating agents and mixed, in this degassing zone, for a period of time sufficient to accomplish deactivation and solubilization of the catalyst.

Other advantages of the utilization of the degassing zone have been found to act as a hold tank to provide efficient catalyst deactivation and solubilization and to serve as a surge tank, or buffer, between the reaction zone and a polymer wash zone. The pressure differential also allows the transfer of slurry from the reaction zone to a wash zone.

The slurry is then conducted to a liquid-full polymer wash zone wherein it is introduced into a tower such that the solid polymer of the slurry flows downwardly in countercurrent flow with liquid propylene which is introduced through a bottom inlet of the wash zone. This countercurrent wash with propylene accomplishes removal of impurities, i.e., deactivated soluble catalyst and soluble polymer residues from the solid polymer which is recovered out of the bottom of the wash zone. The wash zone is operated at a pressure below that of the reaction zone, i.e., substantially the same as that of the degassing zone, in order to utilize the pressure differential to move the slurry through all zones of the process.

DETAILED DESCRIPTION OF THE PREFERRED EMBODIMENT

Figure 1:
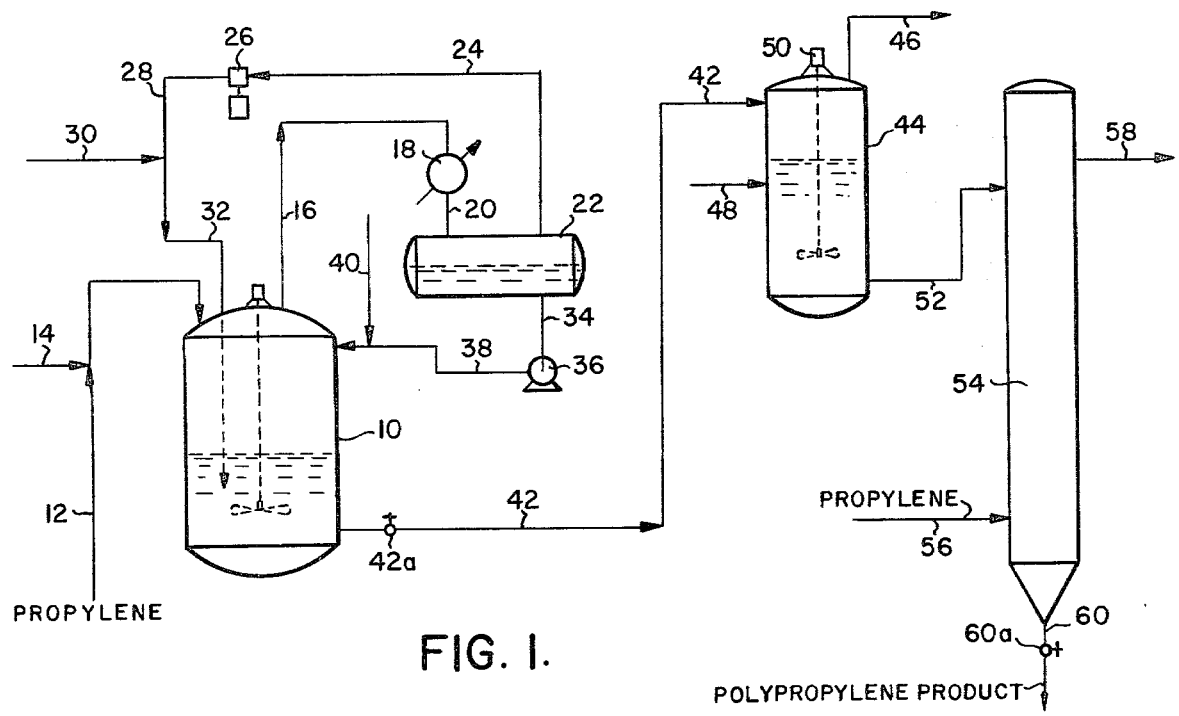
FIG. 1 is a schematic flow sheet, with common valves, fittings, instruments, pumps, motors and the like omitted showing the method of this invention.

Broadly speaking, the present invention resides in employing an autorefrigerated polymerization reactor for the polymerization of propylene and a liquid-full propylene wash system for product purification, operated at different pressures, which is accomplished by employing means, interconnecting the autorefrigerated reactor and wash systems, for degassing the liquid polymer slurry from the reactor for passage of the slurry to and through the wash system. The contents of the autorefrigerated reaction zone would have a vapor phase and a liquid phase wherein the heat of reaction is removed by the vaporization of liquid propylene reaction media. One such system of autorefrigerated reactor operation especially suited for the method of this invention is described in U.S. Pat. No. 4,058,652 the disclosure of which is incorporated herein by reference. The propylene, and other olefins if a copolymer is being prepared, contact a Ziegler-type polymerization cocatalyst system, usually in the presence of hydrogen, and react in the liquid phase at an elevated temperature, usually from about 110° (43.3° C.) to about 190° F. (87.7° C.), and preferably from about 140° (60° C.) to 170° F. (76.7° C.) and a pressure of from about 300 (21.1 kg/cm$^2$) to about 600 psig (42.2 kg/cm$^2$) or preferably from about 450 (31.6) to about 550 psig (38.5 kg/cm$^2$) such that the propylene liquid and vapor phases are in equilibrium. Especially preferred is the selection of conditions where the propylene in the reactor is boiling. The temperature and pressure may vary but the reaction readily occurs and the residence time in such reactor, whether operated in batch mode or continuously, would be from about 1 to about 4 hours or until a concentration of the solid polymer in the liquid propylene phase reaches from about 40 to about 60 weight percent or preferably from about 45 to about 50 weight percent. In continuous reaction systems this would be maintained by balancing the propylene monomer being charged with the solid polymer slurry being extracted.

The polymerization step of the process of this invention may be carried out employing any known catalyst components of the Ziegler-type cocatalyst system for polymerization of alpha-olefins. The Ziegler-type cocatalyst system, while well known, essentially comprises a solid titanium trichloride-containing compound and an organo-metal compound, usually an aluminum alkyl compound, such as aluminum triethyl, diethylaluminum chloride, and the like. The overall method of this invention is particularly adaptable for use with titanium trichloride-containing catalyst components having high catalytic activity.

Such highly active titanium trichloride catalyst components, and methods for their production, have heretofore been described in the prior art. Generally, they are produced by the reduction of titanium tetrachloride with an organoaluminum compound, e.g., an alkylaluminum halide followed by an activation step which results in the conversion of the reduction product to a product which contains TiCl$_3$ of the δ-type. In British Pat. No. 1,391,067 to Solvay & Cie, published Apr. 16, 1975, such a highly active catalyst is obtained by treating such reduced solids product with a dialkyl ether and titanium tetrachloride until such conversion is obtained. Another activation procedure is described in co-pending U.S. Application Ser. No. 774,964, filed Mar. 7, 1977, now abandoned, to Ueno et al wherein such reduced solids product is treated with a C$_2$ saturated chlorinated hydrocarbon in the presence of a dialkyl ether. These references are incorporated herein by reference.

In accordance with the present invention, the amount of catalyst components will vary widely and depend at least in part on the specific cocatalyst system chosen. This determination is well within the skill of the art. The amount of titanium trichloride-containing compound used is generally in the range of $0.5 \times 10^{-4}$ to $10 \times 10^{-4}$ gm/gm of monomer. The alkylaluminum compound component is usually used in an amount of about 0.5 to about 5 mols per 1 gram atom of titanium in the titanium trichloride-containing component and should be in an amount of at least about $1.0 \times 10^{-4}$ gm/gm of monomer. The components of the cocatalyst system may be added to the reaction zone separately or mixed together with a hydrocarbon diluent and fed to the reaction zone with the propylene feed, all in accordance with known procedures.

Usually the polymerization step of the process is carried out in the presence of elemental hydrogen. The hydrogen is usually added in an amount sufficient to provide from 0.03 to about 0.4 mol percent hydrogen, preferably 0.1 to 0.3 mol percent, in the liquid propylene phase of the polymerization reaction zone. By this means the productivity of the cocatalyst system, melt index and flexual modulus values of the polypropylene product are increased. Of course, whether or not hydrogen is employed depends upon the particular product desired and in the practice of this invention may well be omitted.

The method of this invention employs propylene in the liquid phase which acts both as the reaction medium and the raw material for the polymerization. Thus, the propylene must be continuously added to the mass, or bulk, polymerization system during the reaction. As is known, commercially available propylene generally contains minor amounts, sometimes up to about 10%, of materials such as paraffinic hydrocarbons which would be inert materials in the polymerization of propylene. Use of these commercially available streams of propylene feed are to be considered within the scope of this invention as well as more pure propylene feed available without these inert diluents, or impurities.

As mentioned before, the process is preferably carried out in the autorefrigerated reaction zone containing the boiling propylene in the liquid phase and a vapor phase produced by such boiling propylene. The heat produced by the reaction is conducted away from the reaction zone by the vaporization of the propylene which is, as will be more completely described later, cooled and recycled to the reactor.

The liquid phase of the reactor containing, in a slurry from about 40 to about 60 weight percent of the solid polypropylene polymer, any soluble polymer present, the catalyst residue accompanying such solid polymer, and liquid propylene, are next conducted continuously or batchwise to a degassing zone wherein the pressure of the liquid slurry is lowered to from about 40 (2.8) to about 200 psig (14 kg/cm$^2$), preferably from about 40 (2.8) to about 75 psig (5.3 kg/cm$^2$), less than the operating pressure of the reaction zone. This is done to allow the transfer of reactor effluent from the reactor to the liquid propylene wash zone and to allow additional propylene to be vaporized and to lower the temperature of the liquid phase slurry to facilitate the washing with propylene in the liquid phase in the wash zone. Additionally, the degassing zone is operated at a temperature from about 120° (48.9° C.) to about 180° F. (82.2° C.), preferably from about 130° (54.4° C.) to about 160° F. (71.1° C.).

Care must be taken to avoid dropping the pressure to such a point that excessive amounts of the liquid propylene are vaporized leaving a mass of the solid polymer which is too thick to flow readily from the degassing zone. If such should occur however, it is permissible to introduce some fresh propylene into the degassing zone to sweep the solid polymer to the wash zone. Typically, the pressure of the degassing zone will be at a preferred value of about 400 (28 kg/cm$^2$) to about 500 psig (35 kg/cm$^2$) which is generally sufficient to allow the feeding of a wash zone overhead stream to a subsequent propylene recovery step without the need of a compressor. A difference of 50 psig (3.5 kg/cm$^2$) between the reaction zone and degassing zone has been found to be satisfactory.

Further, the degassing zone serves as a zone for efficient deactivation and solubilization of the polymerization catalyst. This is accomplished by adding an effective amount of one of the many known catalyst deactivation agents to the liquid slurry stream, either prior to the introduction into the degassing zone or into the zone itself. The contents of the degassing zone, for efficient catalyst deactivation and solubilization, should be agitated either through a motor and stirrer, preferred, or through some other method to promote intimate contact of the deactivation agents with the polymer. The catalyst deactivation-solubilization agents are well known in the practice of this art and a number of such agents are described in U.S. Pat. No. 3,271,380, for example. Preferred, however, in the use and the practice of this invention are propylene oxide, epichlorohydrin or acetylacetone in conjunction with a chelating agent if desired such as those well known in the art. Usually, the effective amount to deactive and solubilize the catalyst is from about 1 to 5 times the stoichiometric equivalent, based upon the amount of titanium trichloride catalyst compound present.

The slurry containing the polymer is contacted with a sufficient amount of the catalyst deactivating-solubilizing agent, with stirring, for about 5 to about 45 minutes or preferably from about 10 to about 15 minutes. Those of ordinary skill in the art would recognize the time necessary to be sufficient to deactivate and solubilize the catalyst contaminants. This time should be allowed to control the residence time within the degassing zone. The propylene which is vaporized within the zone is removed overhead and recovered for further use.

The liquid slurry, after catalyst deactivation-solubilization, is taken out at the bottom of the degassing zone, preferably through a loop seal, or internal down comer, which allows flowing of the material without pumping to a full liquid propylene wash zone which is usually in the form of a column, either separate or integral with the vessel housing the degassing zone.

The wash zone is operated in the full liquid phase where the polymer is cleaned by removal of previously mentioned product impurities by a liquid propylene wash, usually in countercurrent flow. The pressure of the wash zone is maintained such that it is approximately the same pressure as is occurring in the degassing zone. Additionally, the wash zone is preferably operated at a temperature within the range of about 70° F. to about 130° F. to obtain maximum washing efficiency with liquid propylene. As is well known, and particularly as described in Belgian Pat. No. 824,438 the washing occurs in countercurrent flow with the impurities being removed from the polymer to leave a relatively pure polypropylene or copolymer of propylene to be recovered from the bottom of the wash zone.

The liquid propylene wash is fed to the wash zone through a bottom inlet at a ratio of from about 0.5 to about 5 pounds of fresh propylene per pound of solid polymer in the slurry charged to the zone. Preferably, the ratio is from 1 to about 3 pounds of propylene per pound of solid polymer in the slurry. In the counter-current wash, the solubilized catalyst residue, amorphous polymer and the liquid propylene reaction medium entering the wash zone with the polymer product are separated from the product which is recovered from the bottom. The liquid, including the solubilized catalyst residues and soluble polymer, is removed overhead from the column through an upper outlet stream to a fractionating zone for recovery of the propylene which then can be used again either to add liquid, if necessary, to the degassing zone, as a charge for the reaction zone or as feed for the wash zone.

The foregoing invention will be more completely described by the following description of the attached drawings.

Turning now to FIG. 1, propylene and other olefin monomers if copolymers are to be produced, are charged to an autorefrigerated reactor 10 through line 12. The reactor as described in U.S. Pat. No. 4,058,652 is especially suited for use as the autorefrigerated reactor for use in this process and the disclosure of such patent is specifically incorporated herein. The catalyst (Ziegler-type cocatalyst system) is preferably mixed with the propylene in line 12 through line 14 but may be added directly to the reactor 10. The polymerization reaction occurs in reactor 10 in a liquid phase as previously described with a vapor phase being removed from the reactor through line 16 where it is cooled in heat exchanger 18 and discharged through line 20 into a separation drum 22 wherein the vapors remaining uncondensed are removed through line 24, compressed in compressor 26 and exit through line 28. Hydrogen, if used in the polymerization reaction, is added to the liquid propylene in line 28 through line 30 and the mixture discharged through line 32 into the reaction zone of the reactor vessel 10, preferably below the level of the liquid in the reaction zone as shown in FIG. 1.

The liquid propylene from the separator 22 is withdrawn as a bottoms stream through line 34 and pumped by pump 36 through line 38 to the reactor vessel 10, preferably through a spray means (not shown) for countercurrent contact with the propylene vapor phase to remove entrained solid polymer particles for enhanced reactor antifouling. Additional catalysts or cocatalysts can be added through line 40 and introduced into the reaction vessel 10.

The liquid slurry, as previously described, exits the bottom of the autorefrigerated reactor 10 through line 42 via valve 42a and is introduced into the degassing zone in vessel 44. Additional propylene is vaporized in the degassing zone, operated by pressure differential as previously described, and the vapors are removed through line 46 for recovery and further use. The catalyst deactivating agents are introduced through line 48 directly to the degassing zone but can, alternatively, be introduced directly into line 42 and enter the degassing zone of vessel 44 along with the liquid polymer slurry removed from the reaction zone of the reaction vessel 10. The liquid in the degassing zone of vessel 44 is agitated by motor and stirrer 50. The slurry in the degassing zone of vessel 44 is removed through line 52 and introduced into the liquid propylene wash zone in vessel 54.

Propylene wash liquid is introduced into vessel 54 through a bottom inlet line 56 and contacts the solid polymer moving downwardly through the vessel 54 in countercurrent flow as the liquid propylene moves upward, removing the impurities from the polymer to exit vessel 54 through an upper outlet line 58. The liquid slurry is introduced into vessel 54 at a point near the opening for the outlet line 58 such that maximum contact with the upwardly flowing propylene wash liquid is obtained. The solid polypropylene product is withdrawn from the bottom of vessel 54 through line 60 via valve 60a for drying and any further processing.

Figure 2:
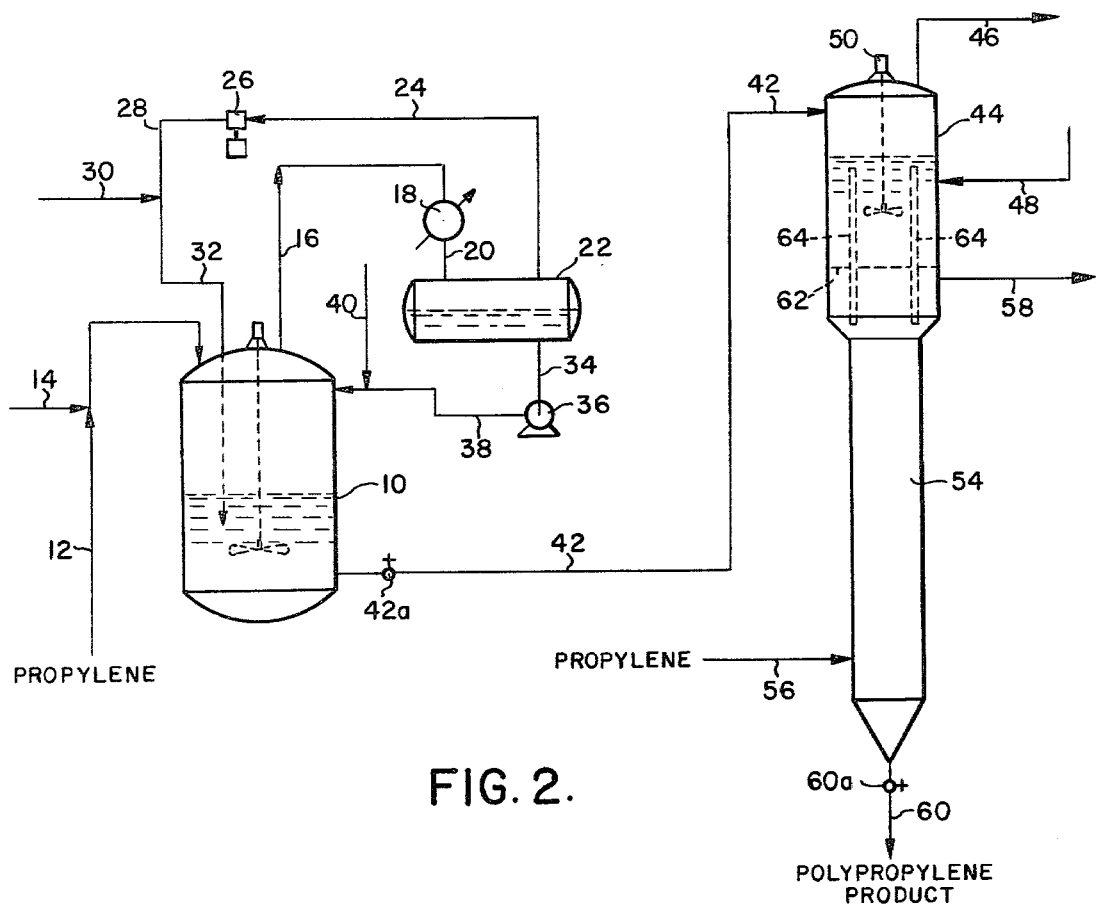
FIG. 2 is a schematic flow sheet showing a preferred embodiment of invention wherein a degassing zone and liquid propylene wash zone are a part of a single vessel. The aforementioned valves, fittings, instruments, pumps, motors, and the like are also omitted from this drawing.

FIG. 2 is a preferred embodiment of the method described hereinabove with respect to FIG. 1 except that the vessel 44 containing the degassing zone is integral with the vessel 54 enclosing the liquid propylene wash zone with a partition 62 separating the two zones and transfer of the liquid from the degassing zone in vessel 44 to the extraction zone in vessel 54 is accomplished through a plurality of internal down comers 64 through the partition 62 between the two zones. This transfer of liquid could also be accomplished externally through a loop seal between the zones.

From the foregoing it is readily seen that many obvious variances can be made from the described method and still be within the scope and spirit of this invention.

I claim:

1. A method for producing a solid polypropylene or propylene copolymer product which comprises:

contacting a Ziegler-type polymerization cocatalyst system with a body of liquid propylene at an elevated temperature in a reaction zone having a propylene liquid phase and a propylene vapor phase whereby heat of reaction is removed by continuously withdrawing the vapor phase from the reaction, said reaction zone being maintained at a temperature and pressure whereby the liquid phase and vapor phase are in equilibrium;

withdrawing portions of the liquid phase as a slurry containing solid polymerized product, liquid propylene, amorphous polymer and catalyst residue from the reaction zone;

introducing the slurry into a degassing zone being maintained at pressure below that of the reaction zone to convey the slurry from the reaction zone with concomitant removal of vaporized propylene therefrom;

adding an effective amount of agents for catalyst deactivation and solubilization to the slurry in the degassing zone for a time sufficient to deactivate and solubilize catalyst residues;

introducing the slurry into a wash zone maintained at substantially the same pressure of said degassing zone;

contacting the slurry with liquid propylene countercurrently in the wash zone to separate deactivated, solubilized catalyst residue and amorphous polymer from the solid polymer product; and recovering the resulting purified solid polymer product.

2. The process of claim 1 wherein the degassing zone and the wash zone are respectively operated at temperatures and pressure sufficient to maintain propylene in the wash zone in liquid phase.

3. The method of claim 1 wherein the reaction zone is maintained at a temperature of from about 110° F. to about 190° F. and from about 300 psig to about 600 psig pressure.

4. The method of claim 3 wherein the degassing zone is operated at a pressure of from about 40 psig to about 200 psig less than the pressure in the reaction zone and wherein the slurry has a residence time in the degassing zone of from about 5 to about 45 minutes.

5. The method of claim 4 wherein the slurry from the degassing zone is introduced into the wash zone at a point intermediate a lower inlet for fresh propylene and an upper outlet for recovery of propylene wash liquid such that the solid polymer product contacts the fresh propylene in countercurrent flow.

6. The method of claim 5 wherein the wash zone is operated at a temperature of from about 70° F. to about 130° F.

7. The method of claim 6 wherein fresh propylene is fed to the wash zone in an amount within the range of about 0.5 to about 5 pounds of fresh propylene per pound of solid polymer in the slurry.

8. The process of claim 1 wherein propylene vapors removed from the reaction zone are cooled and returned in liquid phase to the reaction zone.

9. The method of claim 1 werein the liquid phase in the reaction zone has a concentration of solid polymer products of from about 40% to about 60% by weight.

10. A method for producing polypropylene which comprises the steps of:

contacting, in the presence of hydrogen, a Ziegler-type polymerization cocatalyst system with boiling liquid propylene in a reaction zone, having a liquid phase and a vapor phase, maintained at a temperature of from about 140° to about 170° F. and a pressure of from about 450 to 550 psig while maintaining a concentration of solid polypropylene formed as a slurry in the liquid phase of the reaction zone at from about 45 to about 50 weight percent;

recovering propylene vapors from the vapor phase of the reaction zone and cooling such vapors to partially condense same to liquid propylene;

returning the liquid propylene to the reaction zone and compressing the propylene vapors, returning same, in admixture with hydrogen, to the liquid phase of the reaction zone;

withdrawing portions of the slurry, containing solid polypropylene, catalyst residue and propylene liquid from the reaction zone so as to maintain said concentration of solid propylene in the liquid phase of the reaction zone;

introducing the slurry removed from the reaction zone into a degassing zone;

maintaining the slurry, with mixing, in the presence of a catalyst deactivating-solubilizing agent, in the degassing zone for about 10 to about 15 minutes at a temperature from about 130° F. to about 160° F., and a pressure of about 40 psig to about 75 psig lower than the pressure in the reaction zone, with simultaneous removal of propylene vapor from the degassing zone;

introducing the slurry from the degassing zone into a wash zone such that solid polypropylene will move downward through said zone;

introducing liquid propylene through a bottom inlet to the wash zone to move upwardly, in countercurrent flow with the solid propylene, to be withdrawn from the wash zone from an upper outlet, wherein such propylene is introduced in amounts of from about 1 to about 3 pounds liquid propylene for each pound of solid polypropylene in the slurry introduced into the wash zone;

maintaining the wash zone at substantially the same pressure as the degassing zone and a temperature of about 70° F. to about 130° F., whereby deactivated solubilized catalyst residue and amorphous polymer are separated from the solid polypropylene and exit the wash zone with the liquid propylene through the other outlet of the wash zone; and recovering polypropylene substantially free of catalyst residue, amorphous polymer and liquid propylene from the wash zone.

* * * * *